(12) United States Patent
Dai et al.

(10) Patent No.: US 6,726,746 B2
(45) Date of Patent: Apr. 27, 2004

(54) APPARATUS AND METHOD FOR REMOVING AND FRACTIONATING SORBATES FROM SORBENTS

(75) Inventors: Xiangfeng Dai, Bakersfield, CA (US); Kevin Simpson, Bakersfield, CA (US)

(73) Assignee: American Purification, Inc., Newport Beach, CA (US)

( * ) Notice: Subject to any disclaimer, the term of this patent is extended or adjusted under 35 U.S.C. 154(b) by 0 days.

(21) Appl. No.: 10/037,788

(22) Filed: Oct. 19, 2001

(65) Prior Publication Data

US 2002/0169068 A1 Nov. 14, 2002

Related U.S. Application Data

(60) Provisional application No. 60/241,709, filed on Oct. 19, 2000.

(51) Int. Cl.⁷ .................................................. B01D 53/04
(52) U.S. Cl. ............................. 95/115; 95/143; 95/144
(58) Field of Search .................... 95/107, 110, 111, 95/114, 115, 141, 143–148; 96/122, 123, 126–128, 130, 133, 143, 144, 146, 150; 502/34, 45, 46, 56

(56) References Cited

U.S. PATENT DOCUMENTS

| | | | | |
|---|---|---|---|---|
| 3,118,747 A | * | 1/1964 | Codignola et al. | 55/33 |
| 3,455,089 A | * | 7/1969 | Mattia | 55/62 |
| 3,930,803 A | * | 1/1976 | Winter | 55/DIG. 10 |
| 4,231,764 A | * | 11/1980 | Mattia | 55/28 |
| 4,322,394 A | | 3/1982 | Mezey et al. | 423/244 |
| 4,336,159 A | * | 6/1982 | Winter | 55/62 |
| 4,409,006 A | * | 10/1983 | Mattia | 55/28 |
| 4,414,003 A | * | 11/1983 | Blaudszun | 55/18 |
| 4,421,651 A | * | 12/1983 | Burkholder et al. | 210/672 |
| 4,479,814 A | | 10/1984 | Oliker | 55/162 |
| 4,480,393 A | * | 11/1984 | Flink et al. | 34/27 |
| 4,519,816 A | * | 5/1985 | Clarke | 55/59 |
| 4,565,553 A | * | 1/1986 | Nowack | 55/59 |
| 4,737,164 A | * | 4/1988 | Sarkkinen | 55/9 |
| 4,846,852 A | * | 7/1989 | Schweitzer et al. | 55/31 |
| 4,869,734 A | * | 9/1989 | Jacquish | 55/60 |
| 5,069,038 A | | 12/1991 | Peinze | 62/18 |
| 5,187,131 A | * | 2/1993 | Tiggelbeck et al. | 502/34 |
| 5,282,886 A | * | 2/1994 | Kobayashi et al. | 95/131 |
| 5,453,259 A | * | 9/1995 | D'Souza | 423/245.1 |
| 5,509,956 A | * | 4/1996 | Opperman et al. | 95/109 |
| 5,547,491 A | * | 8/1996 | Berwian et al. | 95/12 |
| 5,595,586 A | * | 1/1997 | Sivavec | 95/143 |
| 5,667,559 A | * | 9/1997 | Vickery | 95/110 |
| 5,676,738 A | * | 10/1997 | Cioffi et al. | 95/109 |
| 5,958,109 A | * | 9/1999 | Fuderer | 95/99 |
| 6,022,399 A | * | 2/2000 | Ertl et al. | 95/114 |
| 6,027,550 A | * | 2/2000 | Vickery | 95/107 |
| 6,364,936 B1 | * | 4/2002 | Rood et al. | 95/115 |
| 6,372,018 B1 | * | 4/2002 | Cowles | 95/18 |

* cited by examiner

Primary Examiner—Robert H. Spitzer
(74) Attorney, Agent, or Firm—Richard L. Myers; Myers Dawes Andras & Sherman LLP

(57) ABSTRACT

A method for removing a first sorbate having a first desorption activation energy and a second sorbate having a second desorption activation energy from a sorbent, involves a two-stage desorber. In a first stage, the first sorbate, second sorbate and the sorbent are contacted with a stripping fluid having a first temperature sufficient to separate the first sorbate in a vapor phase from the sorbent. In a second stage, the second sorbate and the sorbent is heated to a second temperature higher than the first temperature to separate the second sorbate in a vapor phase from the sorbent. The second sorbate can then be condensed to a liquid phase and sold to offset the costs of the process. Heating in the second phase can be facilitated by the introduction of microwave or infrared energy for stripping the second sorbate from the sorbent. Use of the microwave or infrared energy can be facilitated with a purging gas which can also be heated to function as a stripping gas. An associated apparatus includes two desorption chambers or alternatively a single desorption chamber for use in both stages.

19 Claims, 5 Drawing Sheets

APPARATUS AND METHOD FOR REMOVING AND FRACTIONATING SORBATES FROM SORBENTS

This application claims the benefit of Provisional Application No. 60/241,709, filed Oct. 19, 2000.

BACKGROUND OF THE INVENTION

1. Field of the Invention

This invention relates generally to apparatus and methods for removing sorbates from sorbents and more specifically to such methods and apparatus which remove the sorbates based on different boiling points (BP) and/or different levels of desorption activation energy (DAE).

2. Discussion of Relevant Art

In the process of heating various substances, chemicals are often released which must be collected and disposed of. This is particularly true with respect to volatile organic chemicals (VOCs) which are often toxic or otherwise dangerous. In one such process, wood is dried by heating. In this process, water is given off along with volatile organic chemicals including methanol, formaldehyde and terpines. In this process, the chemicals are typically adsorbed onto a resin-base material such as Optipore (a trademark of Dow Chemical) resin, carbonaceous resin or even activated carbon. Other processes rely on absorption to withdraw VOCs and other chemicals. Given that the current invention relates to processes involving absorption as well as adsorption, the chemicals involved, such as VOCs, will be referred to as sorbates, and the attraction media, such as the Optipore resin, will be referred to as sorbents. In these processes, the sorbents approach their maximum level of sorption, at which point, the sorbates are fully adsorbed onto or absorbed into the sorbents.

The spent sorbents are then processed to remove the sorbates so that the sorbents can be reused. In the past, the spent sorbents have been introduced to a single stage desorber where hot stripping gases have been introduced to the sorbents at a level sufficient to remove substantially all of the sorbates from the sorbents. The temperature of the gas has been sufficient to volatilize all of the VOCs simultaneously. The effluent vapor including all of the VOCs has typically been burned off. The cost of this process has been derived primarily from the cost of heating the stripping gas. Since all of the VOCs must be volatilized, the degree of heat required is that associated with the VOC having the highest boiling point (BP) or desorption activation energy (DAE). Attempts to economize and otherwise facilitate these processes have included various methods for introducing the spent sorbents to the desorber. As a result, the single stage process has been applied to fluidized beds, moving beds and even packed beds or batch processes.

SUMMARY OF THE INVENTION

These deficiencies of the past are overcome with the present invention which appreciates that each of the VOCs has a different boiling point (BP) and/or a different level of desorption activation energy (DAE). A dual stage desorber is provided with a primary stage which may include a fluidized bed, a moving bed or a packed bed. A hot stripping gas is introduced to the spent sorbents at a temperature sufficient to volatilize only those VOCs having the lowest BP and/or the lowest DAE components. In the exemplary process for drying wood, these components with the lowest BP or DAE may include methanol, formaldehyde and/or water, but not the terpines. For destructive application, the removed vapors can be burned or oxidized. A heat exchanger can also be used to recover some of the thermal energy to heat the stripping gas. For recovery applications, the removed vapors can be directed to a cooling system to be condensed.

In a second stage of the dual-stage desorber, the sorbates or VOCs having the highest BP and/or highest DAE, such as the terpines, can be removed from the sorbents together with any residual lower BP and/or lower DAE components. In this removal step, microwave or infrared energy can be used with a sweeping gas, such as nitrogen, to provide the desorption energy. Alternatively, or perhaps in combination, a hot fluid can be directed through the bed at a temperature substantially higher than that applied in the first stage. The resulting vapors can be directed through a cooling system for recovery or further fractionation. For example, the vapors can be distilled to a liquid state. This can be particularly advantageous to the economies of the process, as these VOCs in the liquid state have a market value and can be reused or resold to offset some of the costs of the process.

The resulting process offers several advantages both technologically and economically. From a technical standpoint, the sorbates can be separated so that they can be dealt with separately. Those having future value can be reused.

From an economic standpoint, the total volume of the sorbates is reduced in the first stage where the operation has a lower cost per unit weight. In the second stage where the cost per unit weight is greater, the overall weight has been reduced so that the overall cost is significantly less. Notwithstanding these reductions in the cost of operation, the separation of VOCs enables those having future value to be separated and reused or resold.

These and other features and advantages of the invention will become more apparent with the description of preferred embodiments in reference to the associated drawings.

DESCRIPTION OF PREFERRED EMBODIMENTS AND BEST MODE OF THE INVENTION

Figure 1:
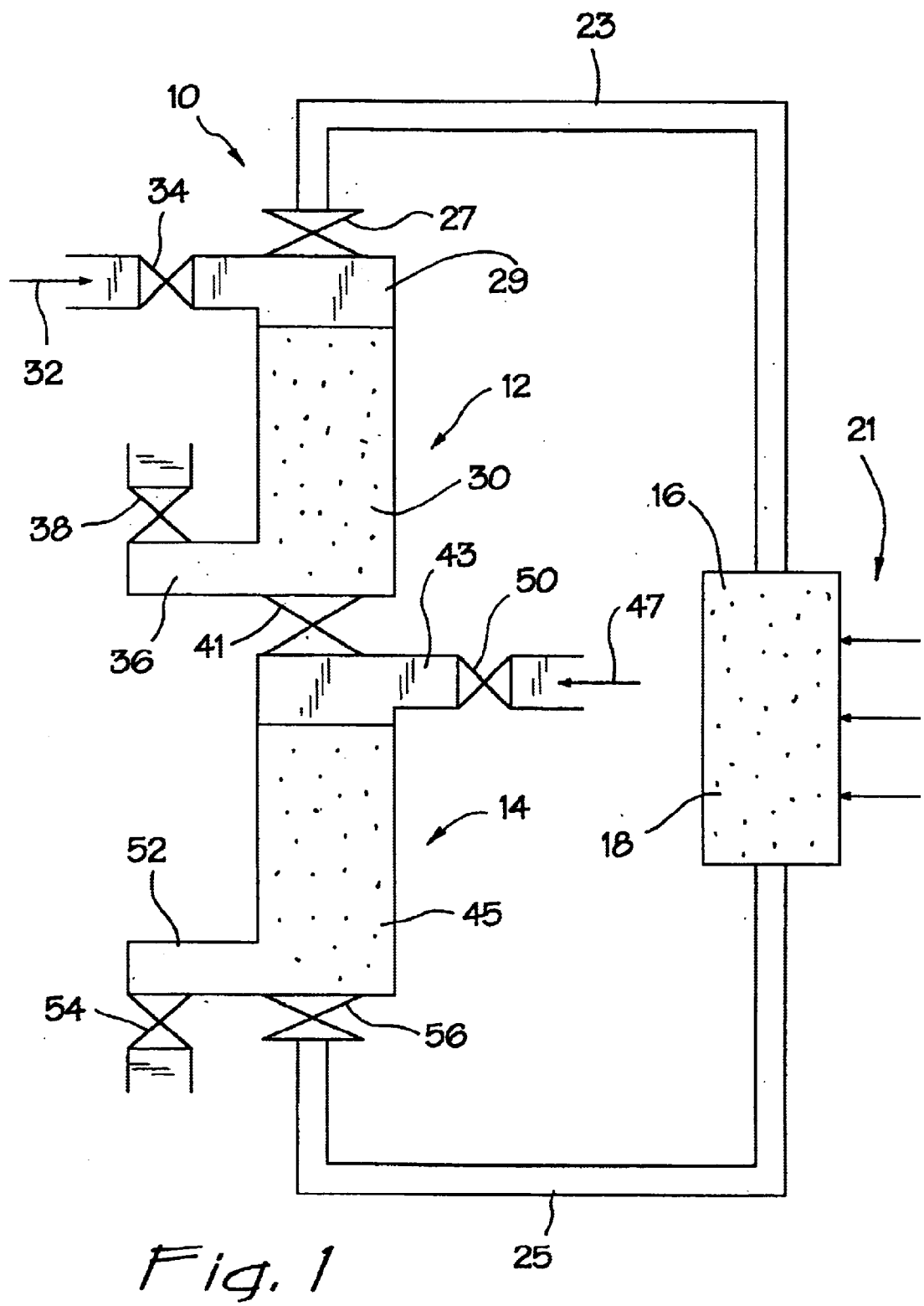
FIG. 1 is a schematic view of a moving bed dual-stage desorber having two separate desorption chambers each fed with a hot stripping gas.

A dual-stage desorber is illustrated in FIG. 1 and designated by the reference numeral 10. The desorber 10 in this embodiment includes a primary stage 12, a secondary stage 14, and a sorption chamber 16 all connected in series in a moving or fluidized bed configuration. In the sorption chamber 16, a sorption media 18, such as resin beads, is exposed to a process effluent containing volatile organic compounds (VOCs). Such a process might involve the drying of wood which provides an effluent having VOCs in the form of methanol, formaldehyde, water and terpines. In FIG. 1, these VOCs are illustrated by a plurality of arrows 21 which are directed toward the sorption media 18 in the sorption chamber 16. After the sorption media 18 is loaded with the VOCs 21, the media 18 is directed through a conduit 23 and into the primary desorption stage 12 and the secondary desorption stage 14 where the VOCs 21 are removed from the media 18. The cleaned or desorbed media 18 can then be directed through a conduit 25 back to the sorption chamber 16 in a continuous process.

In the illustrated embodiment, the conduit 23 delivers the loaded sorption media 18 to a control valve 27 and into an intake manifold 29. This manifold 29 leads to a desorption chamber 30 in the primary desorption stage 12. During the time that the loaded sorption media 18 is in the chamber 30, a low energy stripping gas 32, such as air, can be introduced through a valve 34 and into the intake manifold 29. This gas is fed into the desorption chamber 30 where it functions to strip certain of the VOCs 21 from the sorption media 18.

It is the purpose of the primary desorption stage 12 to—1) remove those VOCs which will respond to the low energy stripping gas 32, and 2) to reduce the amount of VOCs 21 which must be addressed by a higher energy source. Thus, the low temperature stripping gas 32 might typically remove a large portion of the methanols, formaldehydes and water in the case of a wood drying process. The stripping gas 32 and stripped VOCs are collected in an output manifold 36 and the resulting vapors output from the primary stage 12 through a control valve 38.

The VOCs removed in the primary stage 12 will be those having the lowest BP and/or the lowest DAE. When a low energy stripping gas is used, only these components are likely to be affected. In the process previously mentioned for drying wood, the low temperature stripping gas 32 might include air at a temperature between forty and one hundred degrees centigrade. Within this range, temperatures above sixty degrees Celsius are preferred. With a flow rate sufficient to maintain the sorption media 18 within the chamber 13 for approximately ten to thirty minutes, a large percentage of the low BP and/or DAE components will be removed.

With these low boiling point components substantially removed, the sorption media 18 can be passed through an airlock mechanism 41 and into an intake manifold 43 and a second desorption chamber 45 in the secondary stage 14. It is the purpose of the secondary desorption stage 14 to remove any remaining low boiling point components as well as substantially all of the high boiling point components of the VOCs.

In the secondary stage 14, a high energy stripping gas 47 can be introduced through a control valve 50 into the intake manifold 43. In the desorption chamber 45, the stripping gas 47 functions in much the same way as the low energy gas 32 in the primary stage 12. Basically, the gas 47 provides a high temperature source sufficient to generate the boiling point temperature and/or desorption activation energy associated with the remaining VOCs 21. In a preferred embodiment, the stripping gas 47 is preferably inert and may include nitrogen, for example. In the exemplary process for drying wood, the high temperature stripping gas 47 may be provided at a temperature such as 100 to 130 degrees centigrade in order to remove any remaining low boiling point components as well as the high boiling point component such as the terpines. This stripping gas 47 as well as the stripped VOCs can be collected in an output manifold 52 where they can be discharged through a control valve 54 and removed from the system. The desorbed media 18 can then be output through a control valve 56 into the conduit 25 for return to the sorption chamber 16.

From the foregoing discussion it can be appreciated that the cost of operating the primary stage 12 is significantly less than that associated with operating the secondary stage 14. This cost is primarily associated with the cost of the heating of stripping gases 32 and 47 respectively. Where the gas 32 is raised only to a low temperature, the costs are significantly less than those associated with raising the gas 47 to a higher temperature. Accordingly, it is desirable to remove as much of the VOCs as possible in the low cost primary stage 12. Then, only a smaller volume of the VOCs need to be processed at the higher cost to the secondary stage 14.

The cost of operation can also be addressed with respect to disposition of the vapors from the output manifolds 36 and 52 associated with the stages 12 and 14, respectively. Typically, the low boiling point components present in the output manifold 36 will not have significant market value. In the example discussed, these components might include methanol, formaldehyde and water. For destructive application, the vapors of these VOCs can be directed to a burner or oxidizer (not shown), and then to a heat exchanger (not shown) from which part of the thermal energy can be recovered to heat the stripping gas 32. Alternatively, if it is desired to recover these VOCs, the removed vapors can be directed to a cooling system (not shown) for condensation.

By comparison, the VOCs present in the output manifold 52 of the secondary stage 14 might include components which have a market value. In the exemplary case, terpines might be present in the output manifold 52. These vapors can be directed to a cooling system for recovery or further fractionation such as distillation. Note that any cost recovered through the marketing of these high boiling point VOCs, can be used to offset the cost of this dual-stage desorption process.

Figure 2:
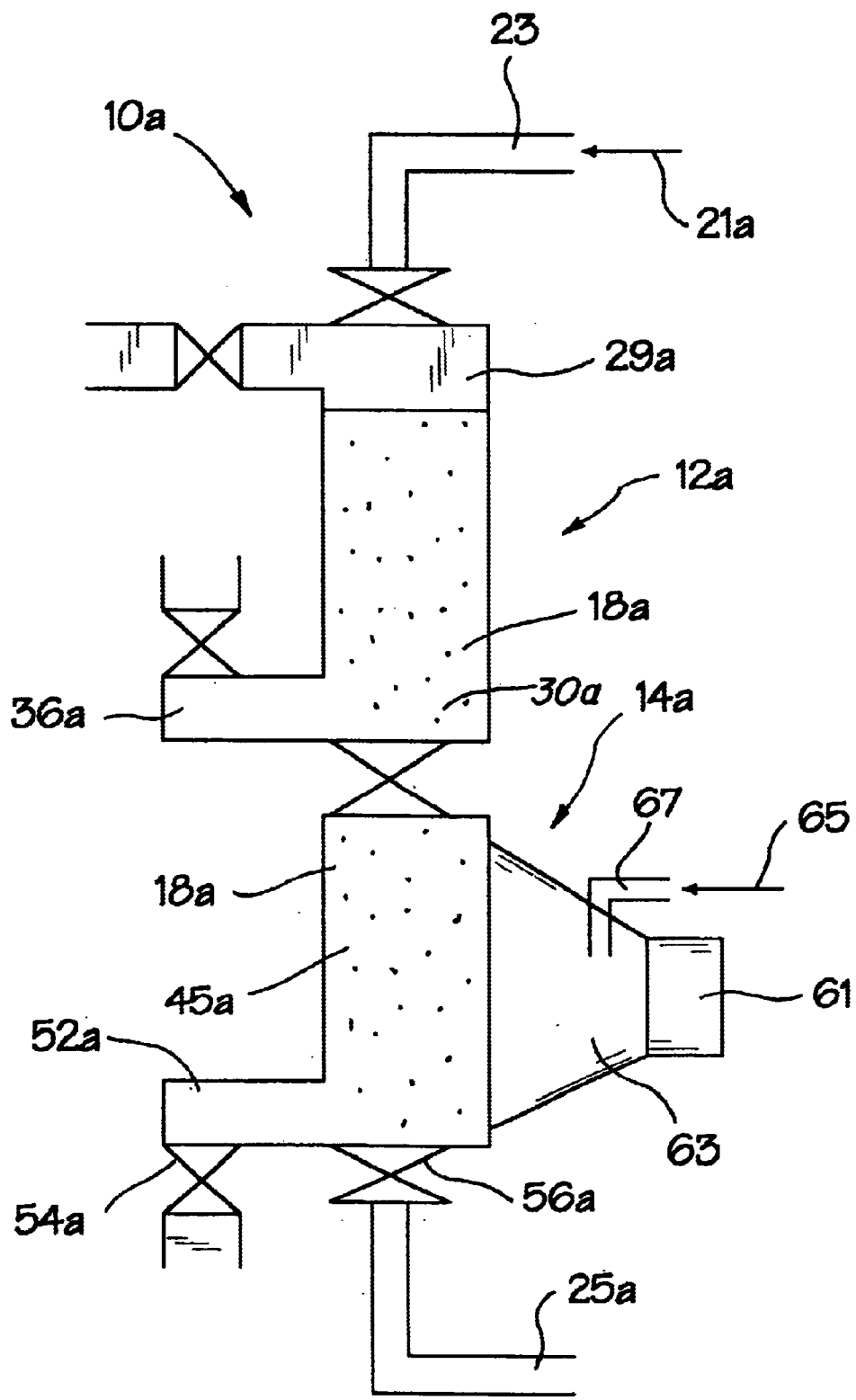
FIG. 2 is a schematic view of an embodiment similar to FIG. 1 wherein the second stage relies on microwave or infrared energy for stripping.

Another embodiment of the invention is illustrated in FIG. 2 where elements similar to those previously described are designated with the same reference numeral followed by the lower case letter "a". For example, the dual-stage desorber is designated by the reference numeral 10a and is illustrated to include the primary desorption stage 12a with the input manifold 29a, the desorption chamber 30a, and the output manifold 36a.

This embodiment differs from that of FIG. 1 primarily in the secondary desorption stage 14a. In this case, the heating is accomplished solely by the use of microwave or infrared energy. As a result, there is no need for an input manifold 43, control valve 50 or high temperature gas 47 (FIG. 1). The secondary stage 14a in this embodiment includes the desorption chamber 45a, the output manifold 52a, and the associated control valve 54a. Clean sorbent is output from the desorber 10a through the control valve 56a and into the conduit 25a. In this embodiment, microwave energy may be supplied to the desorption chamber 45a by a microwave generator 61 and associated diffuser 63. A purging gas 65 can be input to the diffuser 63 through a conduit 67.

As the microwaves from the generator 61 pass through the diffuser 63 and into the desorption chamber 45a, the VOCs 21, such as the terpine, are heated above their BP and/or their DAE so that these components are desorbed from the media 18a. The purging gas 65, such as nitrogen, collects these VOC vapors and directs them into the output manifold 52a for disposition as previously discussed. Desorption heating using microwave energy is disclosed in U.S. Pat. No. 5,509,956 issued on Apr. 26, 1996 and entitled "Regenerative Apparatus For Recovery of Volatiles", which is incorporated herein by reference.

Figure 3:
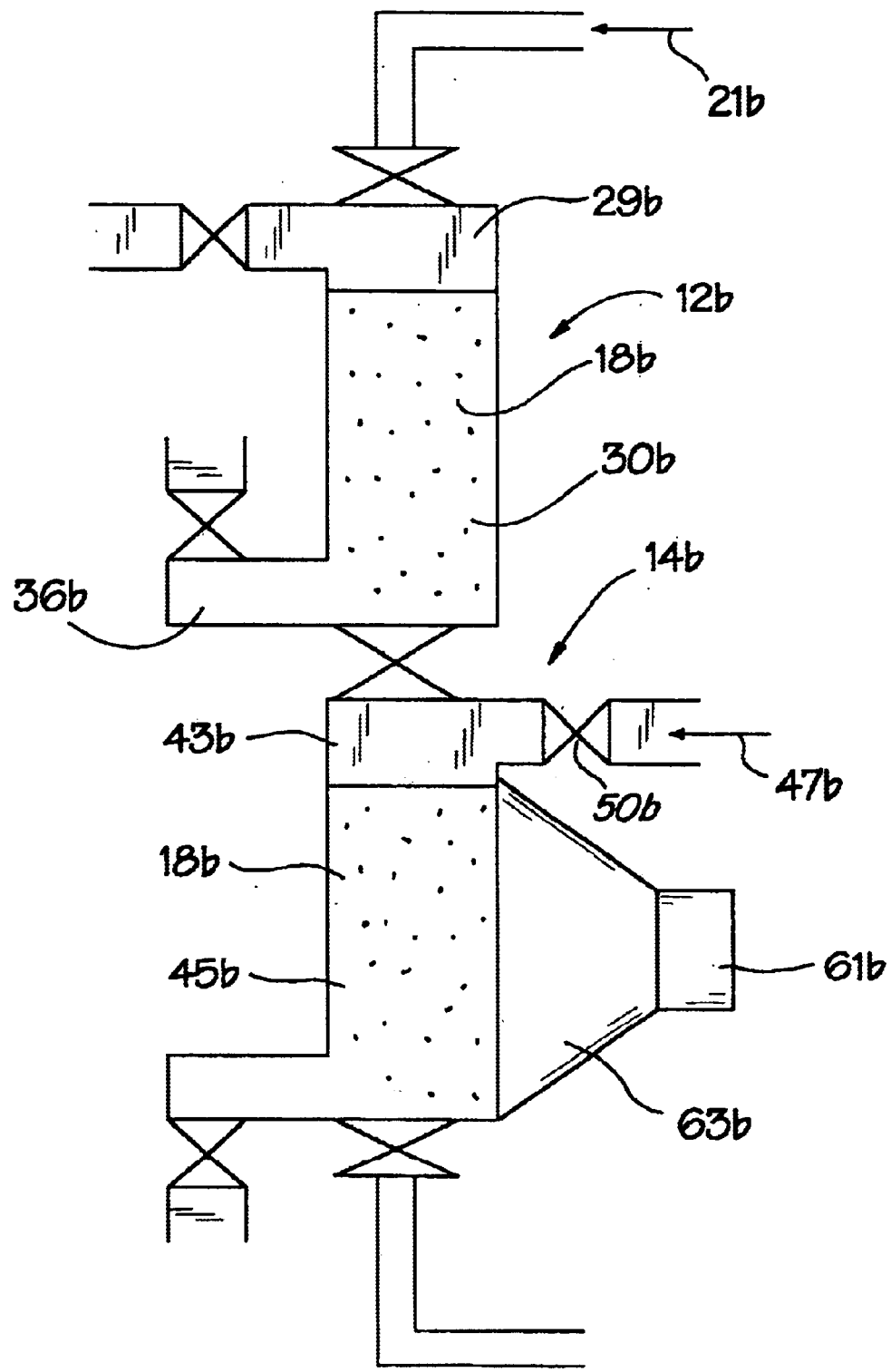
FIG. 3 is a schematic view of an additional embodiment wherein stripping in the second stage is accomplished with a combination of a hot gas and microwave or infrared energy.

A further embodiment of the invention is illustrated in FIG. 3 wherein elements of structure similar to those previously discussed are designated by the same reference numerals followed by the lower case letter "b". This embodiment is substantially a combination of the embodiment illustrated in FIGS. 1 and 2. In this case, the primary stage 12b is substantially unchanged and includes the input manifold 29b, the desorption chamber 30b and the output manifold 36b. As in the embodiment of FIG. 1, the secondary desorption stage 14b in this embodiment of FIG. 3 is provided with the input manifold 43b which is adapted to receive the gas 47b, such as nitrogen, through the control valve 50b. As in the embodiment of FIG. 2, this embodiment of FIG. 3 includes the microwave generator 61b and diffuser 63b which can be provided to facilitate the desorption of the VOCs 21b from the media 18b in the desorption chamber 45b.

In this embodiment, the gas 47b input to the manifold 43b can be provided with a high temperature to facilitate the desorption process as discussed with reference to FIG. 1. Alternatively, the gas 47b can merely function as a purging gas in which its temperature need not be elevated. In this alternative case, the desorption temperature is provided solely by the microwave energy input to the desorption chamber 35b.

Figure 4:
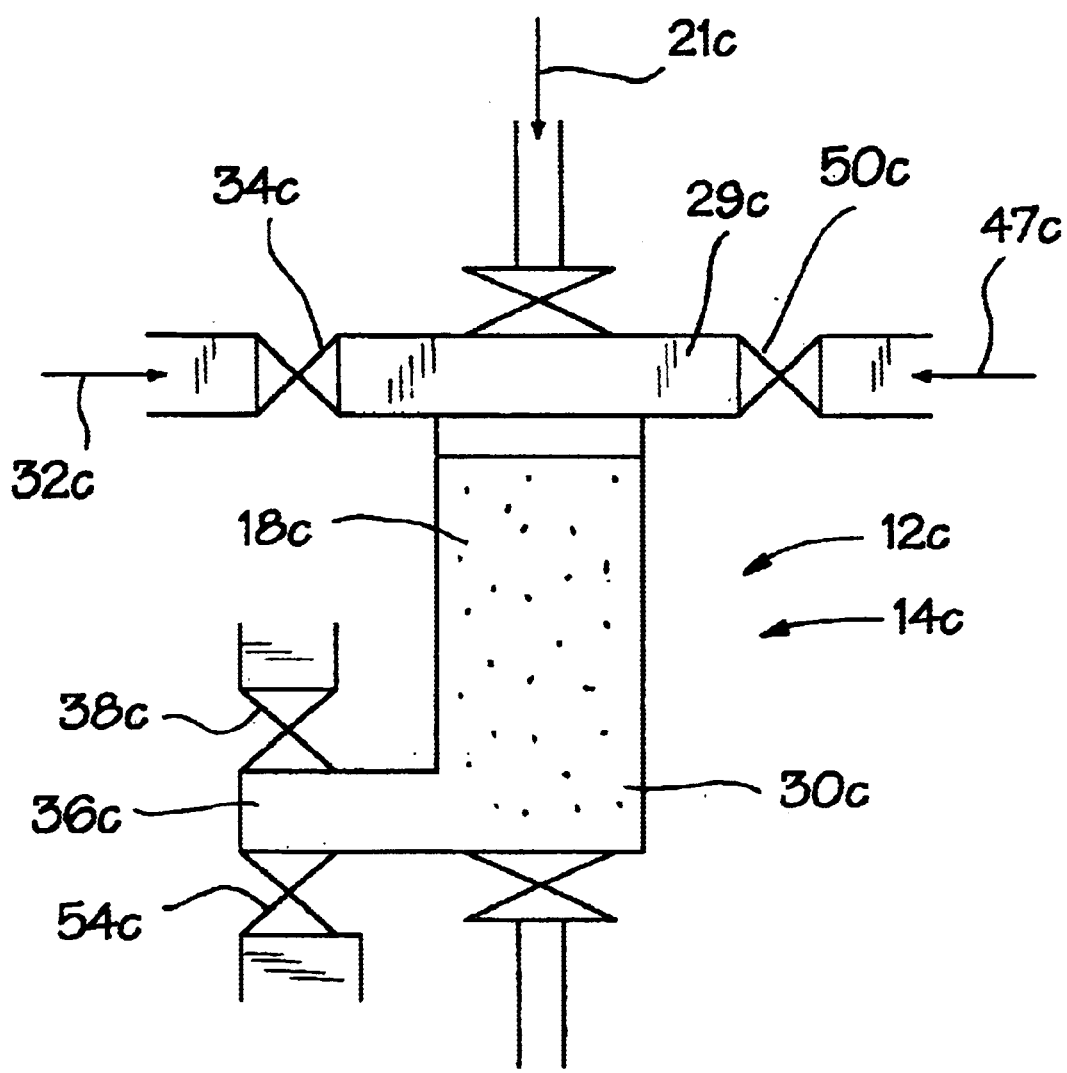
FIG. 4 is a schematic view of a dual-stage embodiment operating with a single desorption chamber and a manifold adapted to receive a first stripping gas and a second stripping gas.

Another embodiment of the invention is illustrated in FIG. 4 where elements of structure similar to those previously discussed are designated with the same reference numeral followed by the lower case letter "c". This embodiment differs from those previously disclosed in that the primary desorption stage 12c and the secondary desorption stage 14c are both accommodated in the desorption chamber 30c. In this case, the input manifold 29c includes the control valve 34c for receipt of the low energy gas 32c, as well as the control valve 50c for receipt of the high gas 47c. In like manner, the output manifold 36c is provided with control valves 38c for the low BP VOCs, and the control valve to 54c for the high BP VOCs.

In operation, the loaded desorption media 18c is moved into the desorption chamber 30c. Initially the low energy gas 32c is input through the control valve 34c into the input manifold 29c. This low temperature gas 32c desorbs the low BP and/or DAE VOCs 21c from the media 18c, and directs these vapors into the output manifold 36c. These vapors can be output through the control valve 38c and disposed of in the manner discussed with reference to FIG. 1. After this primary stage 12c has been completed, the secondary desorption stage 14b can begin. In the manner discussed with reference to FIG. 2, the gas 47c can be provided with a high temperature sufficient to desorb the high BP and/or DAE components, such as terpine, from the media 18c. This high temperature gas 47c can be introduced into the input manifold 29c and subsequently disposed of through the control valve 54c in the manner discussed with reference to FIG. 1.

Figure 5:
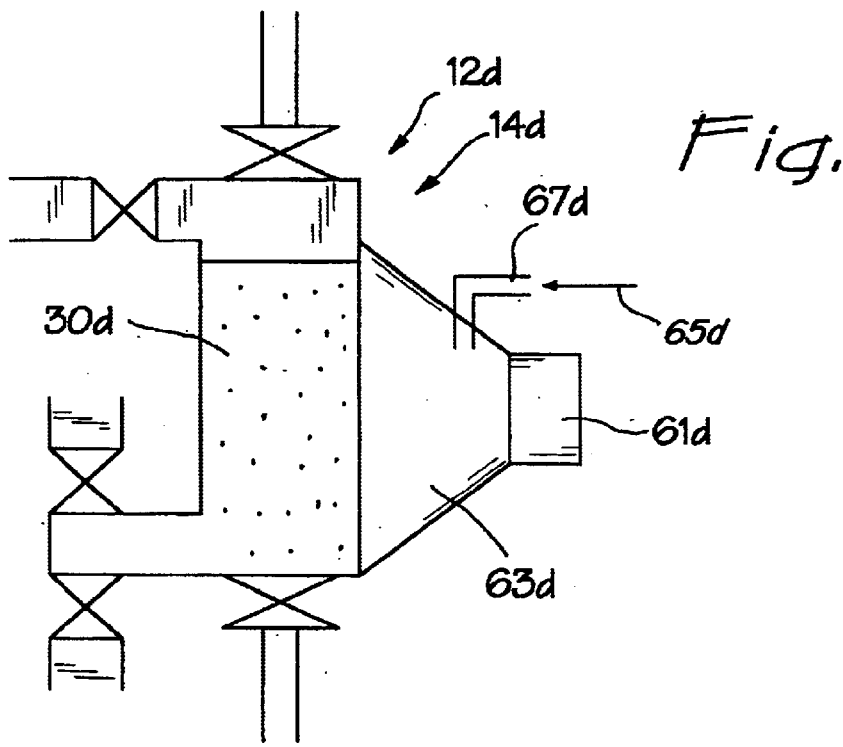
FIG. 5 is a schematic view of a dual-stage desorber including a single desorption chamber adapted to receive a first stripping gas in a first stage and microwave or infrared energy in a second stage.

In a further embodiment of the invention illustrated in FIG. 5, elements of structure similar to those previously discussed are designated by the same reference numerals followed by the lower case letter "d". In this embodiment, desorption chamber 30d accommodates both the primary stage 12d and secondary stage 14d in the single desorption chamber 30d. As in the case of the FIG. 2 embodiment, there is no requirement for a high temperature gas 47a or associated control valve 50a. The stripping energy associated with the secondary stage 14d is provided solely by the microwave generator 61d and associated diffuser 63d. As in the FIG. 2 embodiment, the purging gas 65d can be input to the diffuser 63d through the conduit 67d.

Figure 6:
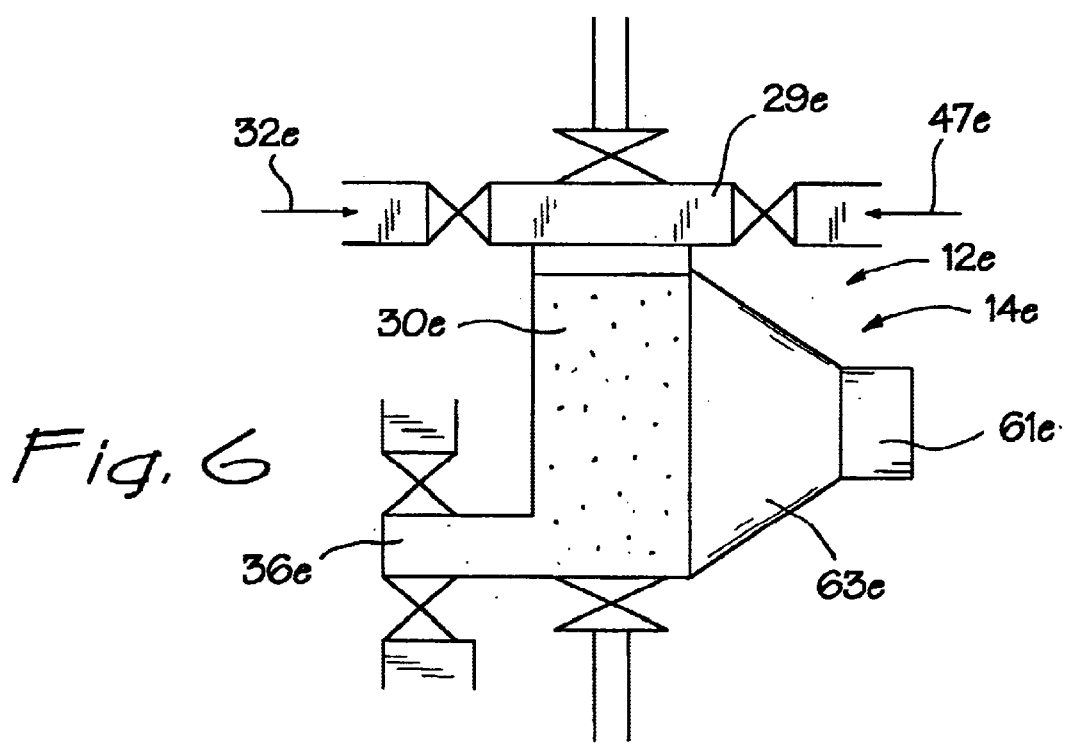
FIG. 6 is a schematic view of a dual-stage embodiment including a single desorption chamber adapted to receive a first gas and a first stage, and a second gas with microwave or infrared energy in a second stage.

In a further embodiment of the invention illustrated in FIG. 6, elements of structure similar to those previously disclosed are designated with the same reference numeral followed by the lower case letter "e". In this embodiment, the primary stage 12e and secondary stage 14e of the FIG. 3 embodiment are accommodated in the single desorption chamber 30e. In this case, the input manifold 29e is used to accommodate the introduction of the low energy gas 32e as well as the high energy gas 47e. This embodiment differs from that of FIG. 4 in that the heating associated with the secondary stage 14e is facilitated by the microwave energy provided by the generator 61e through the diffuser 63e. As noted with reference to FIG. 4, the gas 47e input to the manifold 29e can function as a high temperature stripping gas facilitating the desorption process, or merely as a purging gas which directs the VOCs into the output manifold 36e.

From the foregoing discussion it will be apparent that many modifications can be made to these embodiments to capture and synergize the features and advantages of the invention. For this reason, one is cautioned not to limit the invention to the embodiments described, but rather to determine the scope of the invention only with reference to the following claims.

What is claimed is:

1. A method for removing a first sorbate and a second sorbate from a sorbent, the first sorbate in combination with the sorbent having a first desorption activation energy and the second sorbate combination with the sorbent having a second desorption activation energy higher than the first desorption activation energy, the method comprising the steps of:

contacting the first sorbate, the second sorbate, and the sorbent in a first stage with a stripping fluid having a first temperature sufficient to separate and release a portion of the first sorbate in a vapor phase from the second sorbate and the sorbent;

combusting the first sorbate;

heating the second sorbate and the sorbent to a second temperature higher than the first temperature to separate at least a portion of the second sorbate in a vapor phase from the sorbent;

condensing the second sorbate to change the second sorbate from the vapor phase to the liquid phase; and selling the condensed second sorbate to offset the costs of the process.

2. The method recited in claim 1, wherein:

the contacting step occurs in a first desorption phase; and the heating step occurs in a second desorption stage following the first desorption stage.

3. The method recited in claim 2 wherein the first temperature of the stripping fluid is sufficiently high to produce the first desorption activation energy associated with the first sorbate.

4. The method recited in claim 3 wherein the second temperature is sufficiently high to produce the second desorption deactivation energy associated with the second sorbate.

5. The method recited in claim 1 wherein the heating step includes the step of:
   exposing the second sorbate and the sorbent to one of microwave energy and infrared energy to heat the second sorbate and the sorbent to the second temperature.

6. The method recited in claim 5 wherein the heating step further comprises the step of:
   during the exposing step contacting the second sorbate and the sorbent with a stripping fluid having a temperature of at least the second temperature.

7. The method recited in claim 1 wherein the first temperature is in a range between 40 degrees centigrade and 100 degrees centigrade.

8. The method recited in claim 1 wherein the first sorbate includes formaldehyde.

9. The method recited in claim 8 wherein the second sorbate includes a terpine.

10. The method recited in claim 1 wherein the sorbates are volatile organic chemicals.

11. The method recited in claim 1 further comprising the step of heating wood to dry the wood and release volatile organic chemicals for sorption relative to the sorbent.

12. A process for removing a first sorbate and a second sorbate from a sorbent, the first sorbate in combination with the sorbent having a first desorption activation energy and the second sorbate combination with the sorbent having a second desorption activation energy higher than the first sorption energy, the method comprising the steps of:
   contacting the first sorbate, the second sorbate and the sorbent in a first desorption chamber with a fluid having a first temperature to separate the first sorbate in a vapor phase from the second sorbate and the sorbents;
   disposing of the first sorbate;
   heating the second sorbate and the sorbent to a second temperature in a second desorption chamber to separate the second sorbate in a vapor phase from the sorbent;
   condensing the second sorbate in the vapor phase to change the second sorbate to the liquid phase; and
   selling the second sorbate to offset the costs of the process.

13. The process recited in claim 12 wherein the heating step includes the steps of:
   generating one of microwave or infrared energy; and
   using the one energy to heat the second sorbate to the second temperature to separate the second sorbate in the vapor phase from the sorbent.

14. The process recited in claim 13 wherein during the heating step, the process further comprises the step of introducing a purging gas into the second desorption chamber.

15. The process recited in claim 14 wherein prior to the introducing step the method includes the step of heating the purging gas to at least the second temperature.

16. A method for removing a first sorbate and a second sorbate from a sorbent, the first sorbate in combination with the sorbent having a first desorption activation energy and the second sorbate combination with the sorbent having a second desorption activation energy higher than the first desorption, activation energy, the method comprising the steps of:
   contacting the first sorbate, the second sorbate, and the sorbent in a desorption chamber with a fluid having a first temperature to separate the first sorbate in a vapor phase from the second sorbate and the sorbent;
   disposing of the first sorbate in the vapor phase;
   following the contacting step, heating the second sorbate and the sorbent in the desorption chamber to a second temperature sufficient to separate the second sorbate in a vapor phase from the sorbent
   condensing the second sorbate in the vapor phase to change the second sorbate to the liquid phase; and
   selling the condensed second sorbate to offset the costs of the process.

17. The method recited in claim 16 wherein during the heating step the method further comprises the step of introducing a purging gas into the desorption chamber.

18. The method recited in claim 17 wherein prior to the introducing step the method includes the step of heating the purging gas to the second temperature to facilitate desorption of the second sorbate from the sorbent.

19. A process for drying wood, comprising the steps of:
   heating the wood;
   during the heating step, driving off VOCs in the form of a first sorbate having a first boiling point and a second sorbate having a second boiling point higher than the first boiling point;
   sorbing the first and second sorbates onto a resin-based sorbent;
   in a first-stage, exposing the sorbent and the first and second sorbates in a first volume to a temperature greater than the first boiling point to release the first sorbate from the sorbent;
   in a second stage, exposing the sorbent and at least the second sorbate in a second volume less than the first volume to microwave energy sufficient to heat the second sorbate to a temperature greater than the second boiling point to release the second sorbate from the sorbent;
   condensing at least one of the first sorbate released from the first stage and the second sorbate released from the second stage; and
   selling the condensed sorbate to offset the cost of the process.

* * * * *